(12) United States Patent
De Heer et al.

(10) Patent No.: US 7,186,665 B2
(45) Date of Patent: Mar. 6, 2007

(54) PRODUCTION OF LOW-TEMPERATURE FUEL CELL ELECTRODES

(75) Inventors: Michiel Pieter De Heer, Hoorn (NL); Frank Albert De Bruijn, Alkmaar (NL)

(73) Assignee: Stichting Energieonderzoek Centrum Nederland, Le Petten (NL)

(*) Notice: Subject to any disclaimer, the term of this patent is extended or adjusted under 35 U.S.C. 154(b) by 472 days.

(21) Appl. No.: 10/239,238

(22) PCT Filed: Mar. 20, 2001

(86) PCT No.: PCT/NL01/00225

§ 371 (c)(1),
(2), (4) Date: Dec. 18, 2002

(87) PCT Pub. No.: WO01/71840

PCT Pub. Date: Sep. 27, 2001

(65) Prior Publication Data

US 2004/0086773 A1 May 6, 2004

(30) Foreign Application Priority Data

Mar. 20, 2000 (NL) .................... 1014696

(51) Int. Cl.
*H01M 4/88* (2006.01)
*H01M 4/00* (2006.01)
*H01G 9/00* (2006.01)

(52) U.S. Cl. .................. 502/101; 429/40; 429/41; 429/42; 429/43; 429/44; 361/502; 361/523; 361/434

(58) Field of Classification Search .............. 502/101, 502/185; 429/40–44; 361/502, 523, 434, 361/503
See application file for complete search history.

(56) References Cited

U.S. PATENT DOCUMENTS

| | | | | |
|---|---|---|---|---|
| 4,568,442 A | * | 2/1986 | Goldsmith | 204/284 |
| 5,136,474 A | * | 8/1992 | Sarangapani et al. | 361/502 |
| 5,211,984 A | * | 5/1993 | Wilson | 427/115 |
| 5,415,888 A | | 5/1995 | Banerjee et al. | 427/125 |
| 5,547,911 A | * | 8/1996 | Grot | 502/101 |

(Continued)

FOREIGN PATENT DOCUMENTS

EP 0 945 910 9/1999

OTHER PUBLICATIONS

Uchida Makoto et al., "New Preparation Method for Polymer-Electrolyte Fuel Cells", Journal of the Electrochemical Society, vol. 142, No. 2, Feb. 1995, pp. 436-468, XP002155036, "Introduction", "Experimental", table 1 figure 3.

(Continued)

*Primary Examiner*—J. A. Lorengo
*Assistant Examiner*—Patricia L. Hailey
(74) *Attorney, Agent, or Firm*—Young & Thompson

(57) ABSTRACT

A process for the production of electrodes for fuel cells includes applying an ink consisting of a mixture of at least a carbon powder, an ion-conducting polymer and a fluid, the fluid containing at least 3% of an alkanediol, and a fuel cell electrode which can be obtained by applying such an electrode ink to a substrate, followed by a heat treatment.

18 Claims, 5 Drawing Sheets

U.S. PATENT DOCUMENTS

| | | | | |
|---|---|---|---|---|
| 5,716,437 | A | * | 2/1998 | Denton et al. ............ 106/31.92 |
| 5,728,181 | A | * | 3/1998 | Jung et al. ................. 29/623.5 |
| 5,752,988 | A | * | 5/1998 | Okamoto et al. ......... 29/623.5 |
| 5,882,810 | A | * | 3/1999 | Mussell et al. ............... 429/33 |
| 5,982,609 | A | * | 11/1999 | Evans ........................ 361/516 |
| 6,074,692 | A | | 6/2000 | Hulett ........................ 427/115 |
| 6,134,760 | A | * | 10/2000 | Mushiake et al. ......... 29/25.03 |
| 6,156,449 | A | * | 12/2000 | Zuber et al. .................. 429/42 |
| 6,281,161 | B1 | * | 8/2001 | Marsh ........................ 502/339 |
| 6,309,772 | B1 | * | 10/2001 | Zuber et al. .................. 429/33 |
| 6,359,769 | B1 | * | 3/2002 | Mushiake et al. .......... 361/502 |
| 6,524,736 | B1 | * | 2/2003 | Sompalli et al. ............. 429/42 |
| 6,589,685 | B2 | * | 7/2003 | Mizuno et al. ............... 429/44 |
| 6,800,391 | B2 | * | 10/2004 | Odgaard et al. .............. 429/41 |
| 6,844,286 | B2 | * | 1/2005 | Kohler et al. ............... 502/101 |
| 2002/0034674 | A1 | * | 3/2002 | Starz et al. ................... 429/40 |
| 2002/0034764 | A1 | * | 3/2002 | Gabel et al. ................. 435/7.1 |
| 2002/0037449 | A1 | * | 3/2002 | Binder et al. ................. 429/42 |
| 2002/0051901 | A1 | * | 5/2002 | Zuber et al. .................. 429/32 |
| 2003/0008198 | A1 | * | 1/2003 | Mukoyama et al. .......... 429/42 |
| 2004/0023104 | A1 | * | 2/2004 | Kohler et al. ................ 429/42 |
| 2004/0023105 | A1 | * | 2/2004 | Hohenthanner et al. ...... 429/44 |
| 2005/0036020 | A1 | * | 2/2005 | Li et al. ..................... 347/100 |

OTHER PUBLICATIONS

R. B. Moore III et al, "Chemical and Morphological Properties of Solution-Cast Perfluorosulfonate Ionomers", MACROMOLECULES, vol. 21, 1988, pp. 1334-1339, XP002155037, "Experimental Section", no month.

M. S. Wilson et al., "Thin-Film Catalyst Layers for Polymer Electrolyte Fuel Cell Electrodes", Journal of Applied Electrochemistry, GB, Chapman and Hall. London, vol. 22, No. 1, 1992, pp. 1-7, XP00461070, ISSN: 0021-891X, "Preparation of the catalyst layer inks and electrodes", no month.

M S Wilson et al., "High Performance Catalyzed Membranes of Ultra-Low PT Loadings for Polymer Electrolyte Fuel Cells", Journal of the Electrochemical Society, US, Electrochemical Society., Manchester, New Hampshire, vol. 139, No. 2, Feb. 1, 1992, pp. L28-L30, XP000461062 ISSN: 0013-4651, "Experimental".

Database WPI Section Ch, Week 199005 Derwent Publications Ltd., London, GB; AN 1990-032549 XP002155055 & JP 01 309213 A (Matsushita Electric Works Ltd), Dec. 13, 1989 abstract.

* cited by examiner

PRODUCTION OF LOW-TEMPERATURE FUEL CELL ELECTRODES

BACKGROUND OF THE INVENTION

The invention relates to the production of an electrode, the most important components of which consist of a noble metal catalyst and a proton-conducting polymer. Such electrodes are used, inter alia, in fuel cells which contain a proton-conducting polymer membrane as electrolyte (SPFC, Solid Polymer Fuel Cell). A fuel cell of this type is able to convert chemical energy into electrical energy and heat in a clean, quiet and efficient manner. Possible applications are, inter alia, electric transport, heat/power generation on a scale of 1–250 kW and portable equipment.

Such a fuel cell has two electrodes, an anode and a cathode, at which, respectively, a fuel is oxidised and oxidant is reduced. The fuel used can be hydrogen, a hydrogen-containing gas or an organic compound, for example methanol. The oxidant used is usually atmospheric oxygen.

The optimum operating temperature of a low-temperature fuel cell based on a proton-conducting polymer is around 60–80° C. The majority of active electrodes for the oxidation of hydrogen and the reduction of oxygen at such temperatures and in an acid medium contain platinum as catalytically active material. Hydrogen-containing gases which are produced by the reaction of a hydrocarbon in a so-called reformer also contain, inter alia, carbon dioxide and carbon monoxide in addition to hydrogen. Carbon monoxide in particular has a highly adverse effect on the activity of platinum for the electrochemical conversion of hydrogen to protons. A catalyst that contains a mixture of platinum and a second metal, for example ruthenium or molybdenum, in general has a higher activity for electrochemical oxidation of hydrogen in carbon monoxide-containing gases than catalysts based on platinum. With regard to the reduction of oxygen, it is known that catalysts consisting of a mixture of platinum and a second metal, for example chromium or nickel, can have a higher activity than catalysts based on platinum alone.

For efficient utilisation of expensive noble metals in fuel cell electrodes it is extremely important that the surface area/mass ratio of the noble metal used is as high as possible. This is achieved by applying the noble metal from a solution to a support material in such a controlled manner that the crystallite diameter is approximately 2–4 nm. The support material used is generally carbon because of the requisite electrical conductivity. By making use of a carbon with a high surface area per unit mass it is possible to apply an appreciable quantity of noble metal per unit volume of carbon. Widely used support materials are Vulcan XC-72, a carbon powder with a BET surface area of approximately 250 $m^2/g$, Shawinigan Acetylene Black, a carbon powder with a BET surface area of approximately 80 $m^2/g$, and Black Pearls, a carbon powder with a BET surface area of approximately 1475 $m^2/g$.

The requirement for a high electrochemical rate of reaction per unit catalytic surface area is that the catalytic surface area is readily accessible to the gaseous reactants, and to protons and electrons. In addition, in the case of the oxygen reduction reaction it must be possible efficiently to discharge the water produced in order thus to keep the accessibility to oxygen high. For good accessibility to gaseous reactants, the electrode must have a certain porosity, which in SPFCs which function well is of the order of 50%. To achieve a sufficiently high proton conductivity use is usually made of electrodes which, in addition to platinum on carbon, also contain the same proton-conducting polymer as that used to produce the electrolytic membrane. The percentage of proton-conducting polymer must not be too high, since the electronic conductivity and the gas accessibility decrease as the content of proton-conducting polymer increases. In general, a concentration of proton-conducting polymer of 10–50%, in particular 20–30%, based on dry weight, is suitable.

An SPFC electrode consists roughly of two different layers: a thin catalytic layer approximately 5–20 µm thick, where the actual electrochemical reaction takes place, and a thick porous layer approximately 100–300 µm thick, which is termed the electrode backing. The function of this thick layer is to distribute the gas to electrode sections which are not opposite a gas channel, to guide electrons in the lateral direction and to ensure effective water transport from and to the electrode.

The catalytic layer can be applied either to the electrode backing or to the electrolytic membrane. Various techniques for application are known, including atomising, screen printing and coating. In order to make use of these techniques the noble metal-containing carbon particles and the proton-conducting polymer must have been dispersed in a suitable solvent. This dispersion is termed ink. The entire dispersion must have a rheology which makes it possible to process the ink in the manufacturing equipment used. In addition, the solvents used must evaporate within a practical timescale. Evaporation that is too rapid leads to a changing rheology during electrode production, with the consequence that the production of electrodes is not reproducible. In addition, evaporation that is too rapid leads to agglomeration of solid ink components, as a result of which the production process is interrupted. However, it must be possible to remove the solvents used at a temperature of at most 150° C. at a reasonable speed, within at most one hour. Above this temperature of 150° C. changes take place in the proton-conducting polymer in the electrode, as a result of which proton conductivity in the electrode decreases.

In order to obtain a well-dispersed electrode ink use is often made of additives such as binders and surfactants. The function of a surfactant is to reduce any repulsions between the surface of the dispersed particles and the dispersing medium so as thus to obtain a stable dispersion. A binder is in general a component that has the effect of increasing the viscosity.

Examples of components which have the effect of increasing the viscosity are carboxymethylcellulose, polyethelene glycol, polyvinyl alcohol, polyvinylpyrrolidone and other polymer compounds. As a consequence of the polymer character of such compounds which increase the viscosity, these compounds form part not only of the electrode ink but also of the final electrode. Not only is this component then an electrode constituent that has no function in the final electrode but, by interaction with the noble metal surface of the active phase, such a component can also have an adverse effect on the electrochemical activity of the electrode. This results in a reduced capacity per unit of electrode surface.

U.S. Pat. No. 5,330,860 in the name of W. Grot et al. teaches that the proton-conducting, perfluorinated sulphonic acid polymer, such as Nafion, required for the electrode can serve as binder in the electrode ink. Addition of a supplementary component that increases the viscosity becomes superfluous as a result. According to the cited patent, the solvent used is an ether, preferably 1-methoxy-2-propanol. However, such a solvent has too high a vapour tension at room temperature, specifically 12 mbar, as a result of which the viscosity of the electrode ink is subject to change during the electrode production process. Such an ether compound also has adverse consequences for health.

An attractive alternative to the use of a hydrocarbon such as 1-methoxy-2-propanol is water. The use of water as solvent in an electrode ink is described in U.S. Pat. No. 5,716,437 in the name of Denton et al. Water has no effect whatsoever on health and, if suitable, would be the ideal solvent for the production of electrodes. However, water has too high a vapour tension at room temperature, specifically 17 mbar. As a consequence the viscosity of the electrode ink changes during the production process. In addition it is very difficult to print hydrophobic surfaces, which include the electrode backing surfaces which are most common for use in an SPFC, with a water-based ink.

An electrode ink which consists of two immiscible components is described in EP-A 0 945 910. One of the components is an ink which contains the catalyst with the conducting polymer (ionomer) in a polar solvent such as an alcohol or diol, for example propylene glycol, dipropylene glycol, glycerol or hexylene glycol. The other component is an ink containing catalyst without ionomer in an apolar solvent, such as fatty acid esters, for example methyl dodecanoate. After combining the two inks, an electrode having an inhomogeneous microstructure is produced, the inhomogeneity serving to improve the gas transport in the catalytic layer and thus to increase the capacity of the fuel cell. However, the method according to EP-A 0 945 910 is laborious and, moreover, the electrode performance is not yet completely satisfactory.

A method for electrode production in which the starting material used is a colloidal solution of the polymer is described by M. Uchida et al., "New Preparation Method for Polymer-Electrolyte Fuel Cells", *J. Electrochem. Soc.* 142 (1995), 463–468. Propanediol is regarded as an unsuitable solvent by Uchida et al. because it is not possible to form polymer colloids therein because the dielectric constant of propanediol is too high.

SUMMARY OF THE INVENTION

The present invention solves the problems of the prior art described above. Surprisingly, it has been found that a homogeneous electrode can be obtained very suitably using an electrode ink based on an alkanediol, in particular 1,2-propanediol (propylene glycol), optionally mixed with solvents miscible therewith, which electrode can, moreover be produced more simply and/or has a better performance than the fuel cell electrodes known to date. In the text which follows reference is always made to 1,2-propanediol, but other alkanediols, in particular $C_3$–$C_4$ alkanediols, such as 1,3-propanediol, 1,2- and 1,3-butanediol and diethylene glycol, can also be used. The invention therefore relates to a method for the production of an electrode using an electrode ink which contains the customary constituents discussed above, in particular a carbon support or other suitable support with one or more catalyst metals optionally bonded thereto, and an ion-conducting polymer, the solvent at least partially consisting of an alkanediol, preferably 1,2-propanediol. The invention also relates to the electrodes and fuel cells, or capacitors, obtainable by this method. The invention is described in more detail in the appended claims.

BRIEF DESCRIPTION OF THE DRAWINGS

A current/voltage plot of the Example 2 cell is shown in FIG. 1 and the voltage at a given current density against time in FIG. 2.

The current/voltage plot and the voltage measured as a function of time are shown in FIGS. 3 and 4 for Example 3.

Figure 5:
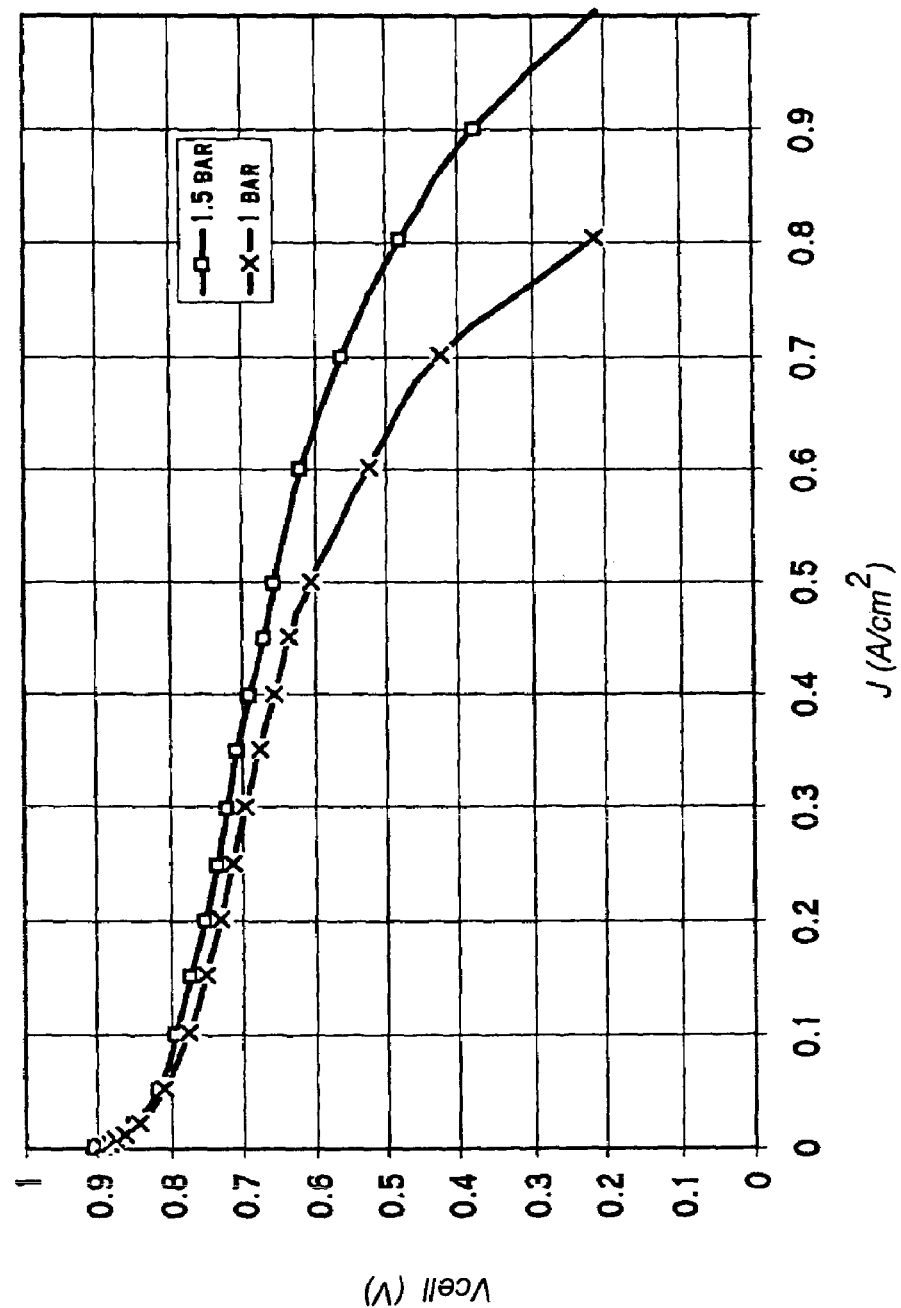

The current/voltage plot of the Example 5 cell is shown in FIG. 5.

DESCRIPTION OF THE PREFERRED EMBODIMENTS

The solvent of the electrode ink therefore consists to at least 3% of an alkanediol. In one embodiment of the method according to the invention, the ink fluid also contains water, for example 80–96% water and 4–20% 1,2-propanediol. The fluid can, however, also be a mixture of alkanediols, or of alkanediols on the one hand and other polar solvents, such as alcohols, alcohol ethers, ethers, esters, amides or sulphoxides, on the other hand, with preferably at least 50%, in particular at least 70% alkanediol. The fluid can also consist completely of alkanediol.

The very low vapour tension of 1,2-propanediol, at room temperature, of 0.2 mbar ensures that no 1,2-propanediol evaporates in discernible amounts during the use of an electrode ink containing 1,2-propanediol as solvent. The viscosity and processibility of such an ink consequently remains constant for a prolonged period of a few hours. In addition, this compound can be adequately removed at elevated temperature, 80–90° C., within a timescale of a few minutes, as a result of which the final electrode can be further processed. With a view to possible harmful consequences to health, 1,2-propanediol is an acceptable compound. The toxicity of 1,2-propanediol is low; it is also used for the preparation of foodstuffs and dermatological products. Because of its very low vapour tension, exposure by inhalation is very easy to prevent. Finally, the polarity of the compound is such that ink based on 1,2-propanediol can be applied easily to both hydrophobic and hydrophilic surfaces. Hydrophobic surfaces such as electrode backings can consequently be printed without too much pressure using an electrode ink based on 1,2-propanediol. In addition, the electrolytic membrane, which is usually hydrophilic, can also be printed using the electrode ink of this invention. In general, swelling of the membrane takes place during the application of electrodes to an electrolytic membrane. This swelling leads to the electrode and the electrode/membrane interface coming under tension. The adhesion of the electrode to the membrane is adversely affected by this swelling behaviour. In addition, small cracks arise in the electrode itself, which has an adverse effect on the electrical contact between the electrode particles. The degree of swelling depends on the solvent. According to the study by R. S. Yeo, published in the journal *Polymer*, Vol. 21, (1980), page 433, the most important parameter determining this degree of swelling is the solubility parameter. According to this study the solubility parameter would have to be close to 0 for minimum swelling, and maximum swelling occurs for solvents with a solubility parameter of 10 $((cal.cm^{-3})^{0.5})$. According to this study 1,2-propanediol ought to produce a swelling comparable to that of primary alcohols such as 1-propanol and ethanol. In practice, however, it is found that a membrane does not swell at all on absorbing 1,2-propanediol, which is of extremely great importance for obtaining dimensionally stable electrodes when these are applied directly to the membrane. In this case the increase in the length of a rectangular piece of membrane was taken as a measure of the swelling. Whilst the increase in water is 10% and that in 1-propanol 18%, the increase in 1,2-propanediol is 0%.

The method according to the invention can be carried out in a manner known per se. The carbon powder is loaded with 5–60% (m/m), in particular 10–45% (m/m), of at least one platinum metal, preferably platinum itself. A second metal such as ruthenium or molybdenum, or chromium, nickel, palladium, cobalt or iridium, can be added hereto in an amount of 0.1 to 75% (m/m), based on the total weight of catalyst metal. The requisite amount of the proton- or ion-conducting polymer, in particular a polymer that contains perfluoralkylsulphonic acid groups ($—C_nF_{2n}SO_3H$), is added to this, for example 10–40% (m/m) based on the carbon/catalyst mixture. Before or after the addition of the polymer or, preferably, at the same time as the polymer, the solvent is added, for example in an amount which leads to a catalyst solids content of 0.1–2 g/ml, in particular 0.5–1.0 g/ml. If necessary, one or more dispersion steps are carried out. The ink in liquid or paste form is then applied in a known manner to either an electrode backing, in a layer having a thickness of 2–50, in particular 4–30, μm, or an electrolyte layer, after which drying is carried out at a temperature of between 75 and 150° C. The electrolyte layer or the electrode backing is then applied, usually with heating (75–150° C.) and optionally under pressure (2–100 bar). A super-capacitor electrode can be produced in a comparable manner, with the proviso that the substrate then usually consists of an electron-conducting film or foam.

Comparing the performance of an inhomogeneous electrode reported in EP 0 945 910 A2, i.e. 540 mV at a current density of 500 mA/cm$^2$, with the performance of a homogeneous electrode according to the present invention, i.e. 600 mV at a current density of 500 mA/cm$^2$, obtained under identical fuel cell conditions shows that the homogeneous electrode according to the invention is to be preferred.

The following examples illustrate the use of electrode inks based on 1,2-propanediol and demonstrate that fuel cells produced using this electrode ink have performances comparable to those of fuel cells that have been produced using electrode inks containing water as solvent. The fuel cell tests were carried out under the following test conditions:

| Type of fuel: | hydrogen |
| --- | --- |
| Type of oxidant: | air |
| Pressure: | 1.5 or 1.0 bar |
| Current density: | 470 mA/cm$^2$ |
| Type of flow: | counterflow |
| Cell temperature: | 65° C. |
| Wetting temperature: | 65° C. |
| Hydrogen/air reactant stochiometry: | 1.5/2.0 |

In all examples the electrode surface area tested was 7 cm$^2$. However, production was also carried out up to surface areas of 310 cm$^2$ without the electrode loading becoming inhomogeneous at this scale. The electrode backings used were all of the ETEK-Elat double-sided or single-sided type. These electrode backings consist of a carbon cloth with a micro-porous, hydrophobic layer on one or two sides. This layer can be inked well without the electrode ink penetrating deeply into the entire structure. This deep penetration of the electrode ink has an adverse effect on the transport of oxygen to the electrochemically active part of the fuel cell cathode. It also leads to inefficient use of the catalyst containing noble metal. This problem can, however, arise if use is made of electrode backings based on macroporous graphite paper, as sold by Toray. This graphite paper can be used, following a step for rendering it hydrophobic, as electrode backing in a solid polymer fuel cell (SPFC). The problem outlined can be solved by adding water to the electrode ink. Thus, an electrode ink in which the fluid consists of 90% water and 10% 1,2-propanediol is exceedingly suitable for applying electrodes to electrode backings without this ink penetrating deeply into the electrode backing. A fluid consisting of 5% propanediol and 95% water is also found to be extremely suitable. An after-treatment step is required in order to obtain adhesion of this electrode to the hydrophobic graphite paper, which after-treatment step essentially consists in a heat treatment at 130° C. for one hour. To obtain optimum fuel cell performance, this electrode must be impregnated with a Nafion solution that predominantly consists of water.

EXAMPLE 1

An electrode ink suitable for screen printing on an electrolytic membrane or on an electrode backing is prepared as follows. 16 g heptane is added to an amount of 2.0 g 40% (m/m) Pt/Vulcan XC72. The whole is mixed well until a dispersed mixture forms. The heptane is evaporated under a gentle stream of nitrogen. An amount of 9.6 g 5% Nafion solution, obtainable from DuPont or Solution Technology Inc., is evaporated to dryness at room temperature. 9.6 g methanol is added to the Nafion that has been evaporated to dryness and the mixture is then treated in an ultrasonic bath for 20 minutes, if necessary at an elevated temperature of, for example 60° C. 1 g 1,2-propanediol is then added. The methanol is evaporated at 60° C. in a vacuum rotary evaporator until no further distillate is collected. The residue is diluted with 1,2-propanediol to a final concentration of 7.5% Nafion in 1,2-propanediol, which corresponds to 6.4 g solution. 2.0 g 40% Pt-on-Vulcan is added to this 6.4 g 7.5% Nafion in 1,2-propanediol. The resulting mixture is heated at 100° C. for 2 minutes, followed by a dispersing step for one minute. After cooling, for example in a refrigerator, the ink is ready for use.

EXAMPLE 2

Figure 1:
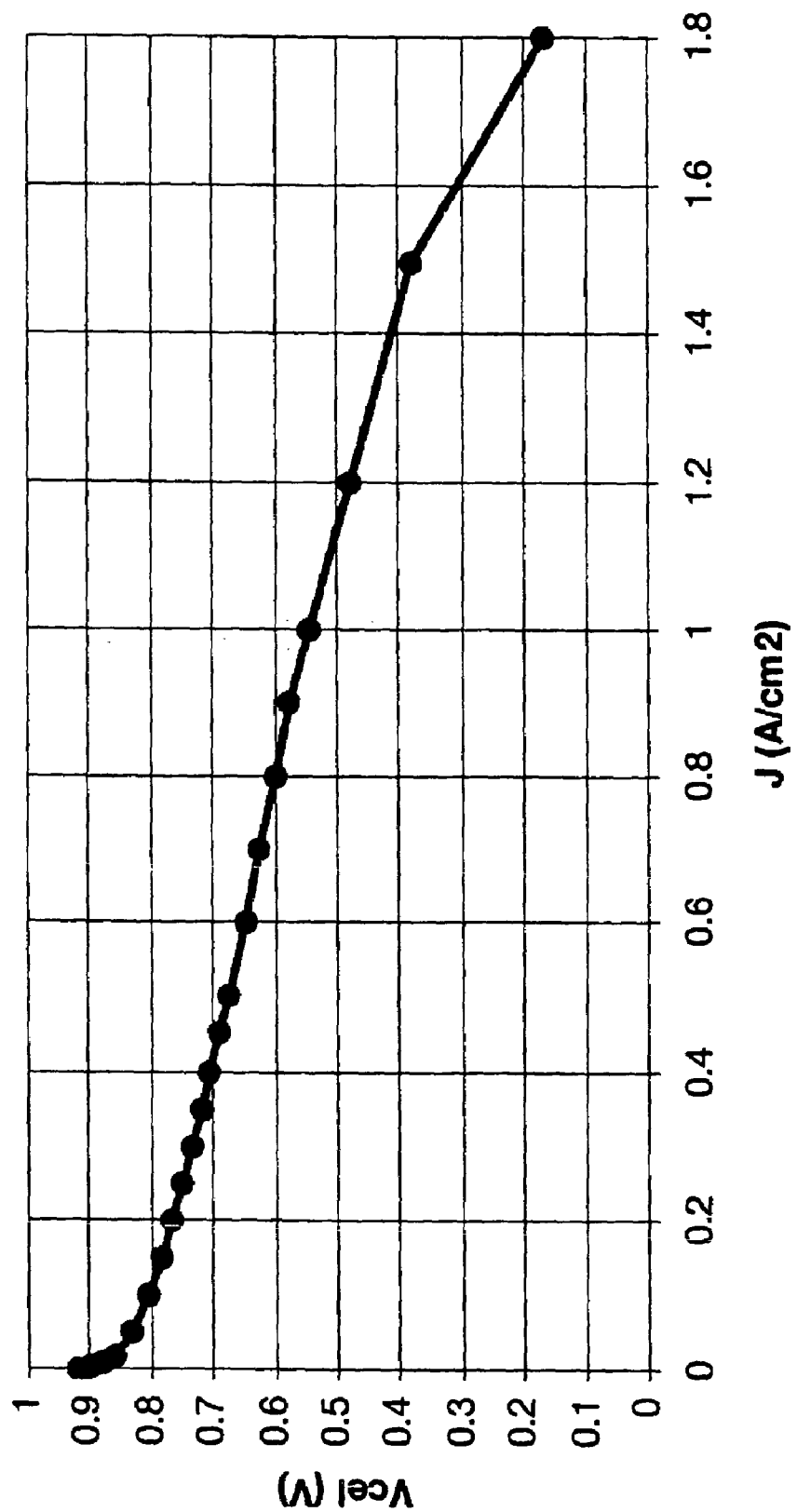
Figure 2:
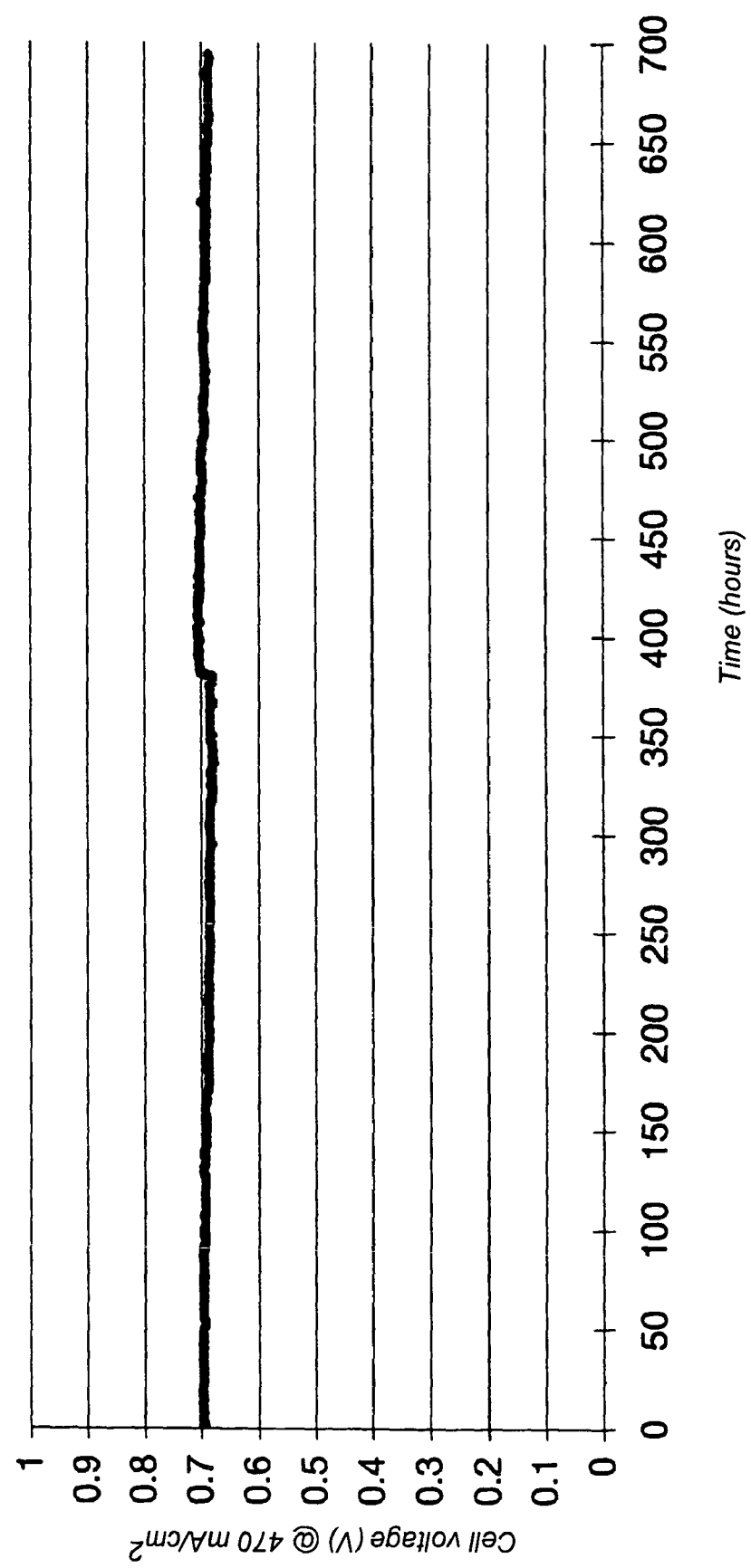
Figure 3:
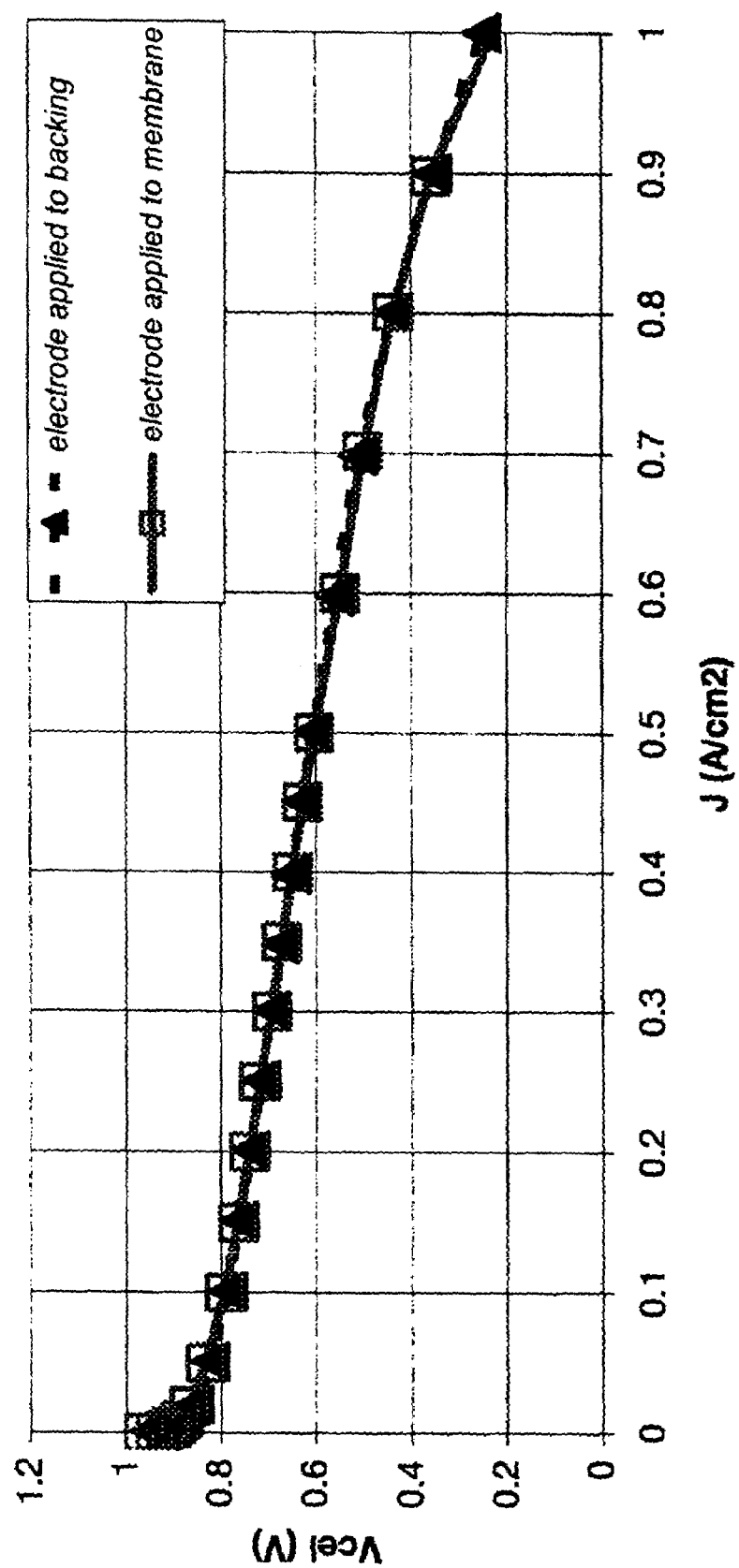
Figure 4:
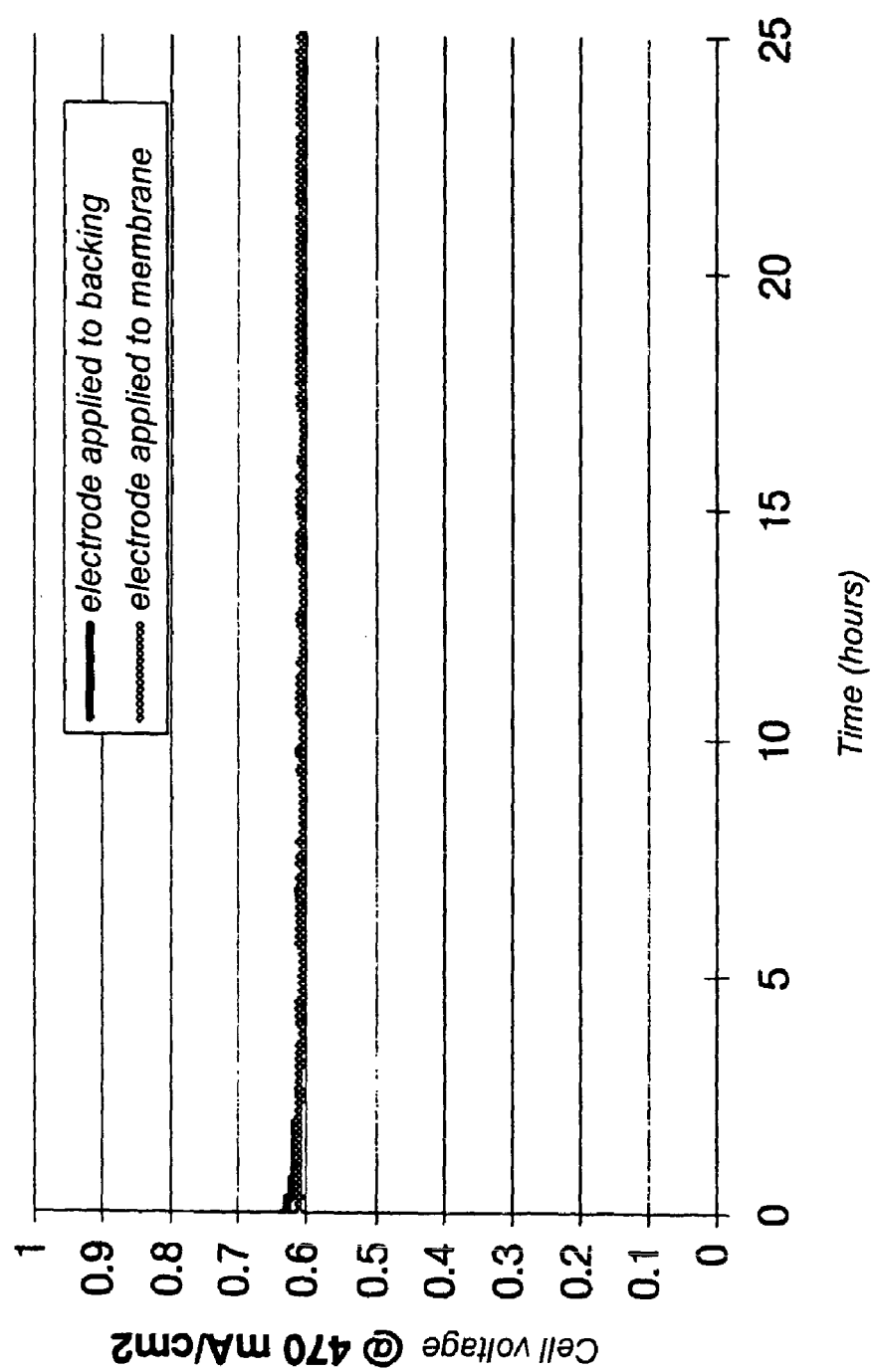

The ink prepared in accordance with Example 1 was applied with the aid of screen printing on a DEK 247 screen printing machine to an electrode backing, purchased from E-TEK Inc. under the name single-sided ELAT-electrode-Carbon only. After applying the electrode to the electrode backing, the ink was dried for 3 minutes at 90° C. under inert conditions (nitrogen atmosphere). A screen printed electrode was then applied by means of a hot pressing step (130° C., 40 kg/cm$^2$) to two sides of a 50 μm thick electrolytic membrane of the Aciplex-S1002 type, purchased from Asahi Chemical. The fuel cell thus obtained had a platinum loading of approximately 0.3 mg/cm$^2$ on both electrodes. The resulting fuel cell was tested under the conditions described above. The current/voltage plot of this cell is shown in FIG. 1 and the voltage at a given current density against time is shown in FIG. 2.

EXAMPLE 3

The ink prepared according to Example 1 was applied with the aid of screen printing on a DEK 247 screen printing machine to both sides, precisely opposite one another, of a proton-conducting membrane of the Nafion 115 type, purchased from DuPont de Nemours Inc. After applying the electrode to the electrolytic membrane, the ink was dried for 3 minutes at 90° C. under inert conditions (nitrogen atmosphere). The resulting membrane/electrode combination was stored for 24 hours in 0.1 M $H_2SO_4$ to remove 1,2-propanediol from the membrane. An electrode backing, purchased from E-TEK Inc. under the name double-sided ELAT-electrode-Carbon only, was then applied to both sides of the membrane-electrode combination in contact with the screen-printed electrode by means of a hot pressing step (130° C., 40 kg/cm$^2$). The fuel cell thus obtained had a platinum loading of approximately 0.3 mg/cm$^2$ on both electrodes.

For comparison, a fuel cell was produced in a manner identical to the method described in Example 2, but on an electrode backing, purchased from E-TEK Inc. under the name double-sided ELAT-electrode-Carbon only, and making use of a Nafion 115 membrane. Both fuel cells were tested under the conditions described above. The current/voltage plot and the voltage measured as a function of time are shown in FIGS. (sic) 3 and 4. [lacuna] from the comparison that both the short-term performance and the long-term stability yield a virtually identical result for both application methods.

EXAMPLE 4

An electrode ink suitable for screen printing on an electrolytic membrane or on an electrode backing is prepared as follows: an amount of 8.8 g 1,2-propanediol is added to an amount of 2.0 g 30% (m/m) Pt/Vulcan XC72. A (sic) 2.0 g of a solution of 25% (m/m) Nafion in 1,2-propanediol is added to this mixture and the whole is dispersed until a thick paste has formed.

EXAMPLE 5

The ink prepared according to Example 4 was applied with the aid of screen printing on a DEK 247 screen printing machine to an electrode backing consisting of graphite paper of the Toray make, provided with a carbon layer of a thickness of approximately 5 μm and rendered hydrophobic. After applying the electrode to this electrode backing, the ink was dried for 3 minutes at 90° C. under inert conditions (nitrogen atmosphere). A screen-printed electrode was then applied to two sides of a 50 μm thick electrolytic membrane, of the Nafion 112 type purchased from DuPont, by means of a hot pressing step (130° C., 40 kg/cm$^2$). The fuel cell thus obtained had a platinum loading of approximately 0.22 mg/cm$^2$ on both electrodes. The resulting fuel cell was tested under the conditions described above, both under 1.5 bar and under 1 bar. The current/voltage plot of this cell under both conditions is shown in FIG. 5.

The invention claimed is:

1. A process for producing an electrode, comprising the steps of:
   bonding carbon particles with catalytically active metals to form a metal-bonded carbon powder;
   applying an ink which contains at least the carbon powder, a proton-conducting polymer and one or more miscible polar solvents to an electron-conducting or ion-conducting substrate, wherein,
   the ink is homogeneous and only contains solvents that are polar and that are miscible with each other,
   the solvents comprise at least 3% by weight of an alkanediol having 3–6 carbon atoms, and
   the proton-conducting polymer is in its acid form.

2. The process according to claim 1, wherein the alkanediol is 1,2-propanediol.

3. The process according to claim 1, wherein the proton-conducting polymer is a perfluorinated sulfonic acid.

4. The process of claim 3, wherein the proton-conducting polymer is a copolymer of tetrafluorethylene and perfluorosulfoethyl vinyl ether.

5. The process according to claim 1, wherein the catalyst contains a noble metal or an alloy of a noble metal with a second metal and optionally a third metal.

6. An electrode obtained by the steps of:
   providing one of an electron-conducting substrate, and an ion-conducting substrate;
   applying, to the provided substrate, an homogeneous ink comprising a carbon bonded with catalytically active metal powder, a proton-conducting polymer in its acid form, and one or more miscible polar solvents comprising at least 3% by weight of an alkanediol having 3–6 carbon atoms, the homogeneous ink containing only polar solvents.

7. The electrode according to claim 6, wherein the substrate comprises an electrode backing.

8. The electrode according to claim 6, wherein the substrate comprises an ion-conducting membrane.

9. The electrode according to claim 8, wherein the ion-conducting membrane is proton-conducting.

10. A fuel cell containing electrodes according to claim 6.

11. A process of producing an electrode, comprising the sequential steps of:
    preparing a carbon support powder by bonding carbon particles with one or more catalyst metals;
    preparing a homogeneous ink comprising the carbon support powder, a proton-conducting polymer in its acid form, and one or more miscible polar solvents comprising at least 3% by weight of an alkanediol having 3–6 carbon atoms; and
    applying the homogeneous ink to a substrate, the homogeneous ink containing only polar solvents.

12. The process of claim 11, wherein, the substrate is one of an electron-conducting substrate and an ion-conducting substrate.

13. The process of claim 11, wherein, the substrate is one of an electron-conducting film and electron-conducting foam.

14. The process of claim 11, wherein, a proton-conducting polymer used is a proton-conducting polymer in acid form.

15. The process of claim 11, wherein, a proton-conducting polymer used is a proton-conducting polymer in acid H$^+$ form.

16. The process of claim 11, wherein the ink contains 0.1–2 g of the content of metal-bonded carbon support powder per ml.

17. The process of claim 11, wherein, in preparing the homogeneous ink, the polar solvents comprises at least 50% by weight of the alkanediol having 3–6 carbon atoms.

18. The process of claim 11, wherein, in preparing the homogeneous ink, the solvent comprises 4–20% by weight of the alkanediol having 3–6 carbon atoms and 80–96% by weight of water.

* * * * *